United States Patent [19]

Dahlstrom et al.

[11] Patent Number: 5,570,627
[45] Date of Patent: Nov. 5, 1996

[54] OVEN APPARATUS

[76] Inventors: Richard C. Dahlstrom, R.R. #2, Fargo, N. Dak. 58102; Clayton A. Melrose, 405 S. 11th, Oakes, N. Dak. 58474

[21] Appl. No.: 481,930

[22] Filed: Jun. 7, 1995

Related U.S. Application Data

[63] Continuation of Ser. No. 169,428, Dec. 17, 1993, abandoned.

[51] Int. Cl.$^6$ .................................................. A47J 37/04
[52] U.S. Cl. ........................... 99/427; 99/443 R; 99/448
[58] Field of Search ............................ 99/427, 419, 420, 99/421 H, 421 HH, 443 R, 443 C, 448, 449, 479, 386

[56] References Cited

U.S. PATENT DOCUMENTS

| | | | |
|---|---|---|---|
| 1,634,142 | 6/1927 | Hammond | 99/427 |
| 1,771,762 | 7/1930 | Allwine | 99/427 |
| 2,253,434 | 8/1941 | Kernick | 99/427 |
| 2,333,175 | 11/1943 | Henley | 99/420 |
| 2,790,380 | 4/1957 | Shryack | 99/427 |
| 3,295,434 | 1/1967 | Wilhelm et al. | 99/427 |
| 4,470,343 | 9/1984 | Didier | 99/448 |
| 4,548,130 | 10/1985 | Diener | 99/443 C |
| 4,549,476 | 10/1985 | Langen | 99/479 |
| 4,723,482 | 2/1988 | Weiss et al. | 99/443 R |
| 4,867,051 | 9/1989 | Schalk | 99/421 P |
| 5,158,066 | 10/1992 | Dodgen | 99/427 |

*Primary Examiner*—Timothy F. Simone
*Attorney, Agent, or Firm*—Robert E. Kleve

[57] ABSTRACT

The invention comprises an oven apparatus. The apparatus has a housing with a main rotary wheel rotatably mounted within the housing. The main wheel has a plurality of radial arms extending radial outward from a center plate to the main rotary frame. A sub wheel rotatably mounted to the outer ends of each of the radial arms of the main wheel. Each of the sub wheels have a plurality of baskets rotatably mounted to the sub wheel at intervals about the outer circumference of each sub wheel. Each of said baskets being elongated and are adapted to receive a plurality of cobs of corn therein for supporting the cob in the baskets in the housing. A heating member is mounted to the bottom of the interior of the housing of the oven for heating the corn cobs being carried in the baskets. A moisture distributing structure is mounted within the housing to maintain the cobs moist to a certain extent while being heated and cooked. An cam means is mounted in the housing and is engagable from outside the housing to cam the baskets in a sub wheel to pivot and tilt the baskets for emptying them, and a drive means is provided for rotating the main wheel and sub wheel to align each sub wheel and each basket in each sub wheel with the camming means for emptying each basket in the main wheel, after being cooked.

5 Claims, 3 Drawing Sheets

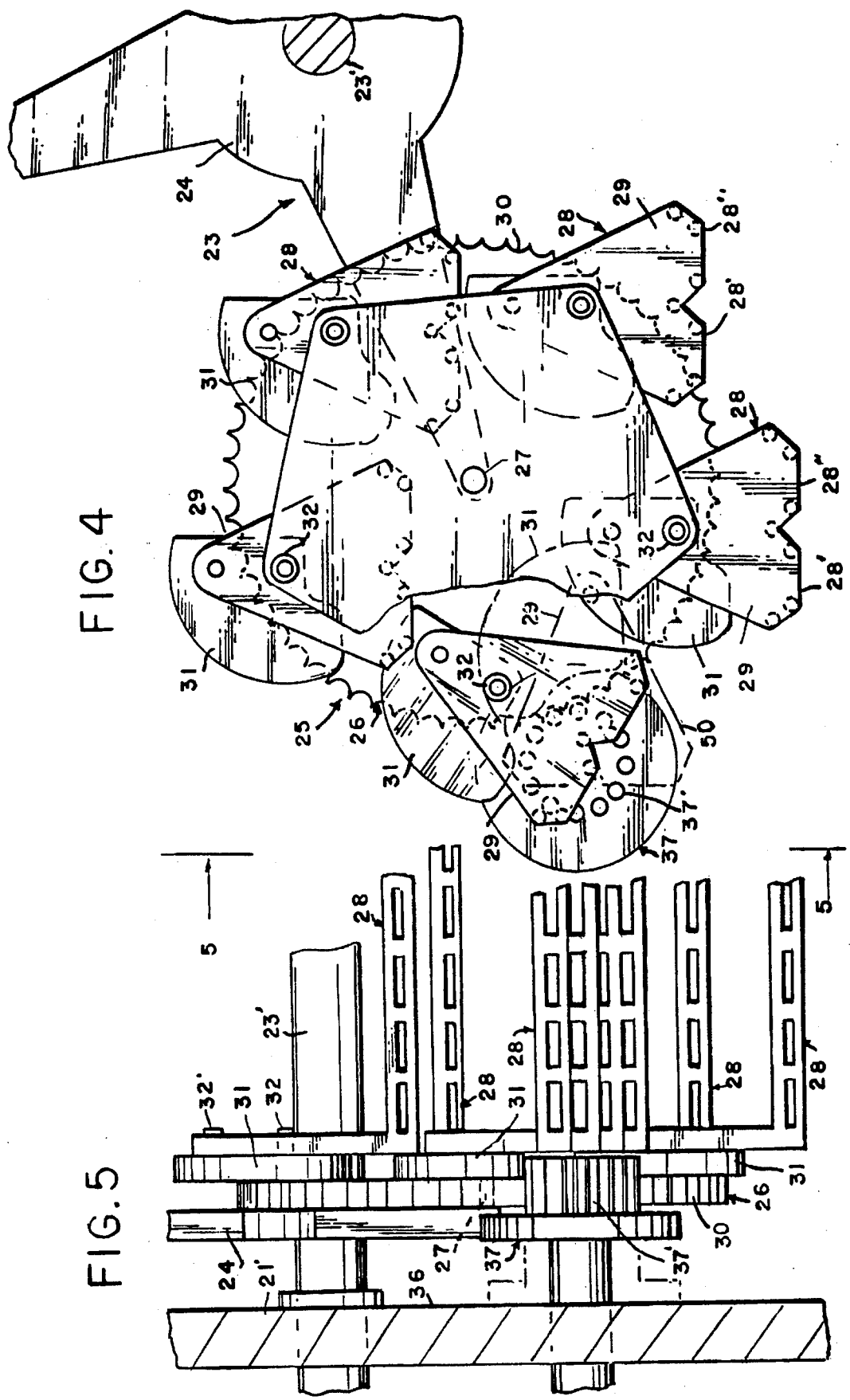

OVEN APPARATUS

This application is a continuation of Ser. No. 08/169,428, filed Dec. 17, 1993, now abandoned.

This invention relates to oven apparatus.

BACKGROUND OF THE INVENTION

It is an object of the invention to provide a novel rotary cooking apparatus having a main rotary member with a plurality of sub rotary members rotatably mounted to the outer circumferential portions of the main rotary member, with the sub rotary member having a plurality of receptacles mounted about the circumference for carrying corn cobs within a heating chamber for cooking the corn cobs.

It is a further object of he invention to provide a novel rotary cooking apparatus for cooking relatively large quantities of food, such as corn cobs, in manner that they receive a relatively even heat with respect to one another.

It is a further object of the invention to provide a novel rotary cooking apparatus for cooking food in large quantities.

Further objects and advantages of the invention will become apparent as the description proceeds and when taken in conjunction with the accompanying drawings wherein

BRIEF DESCRIPTION OF THE DRAWINGS

FIG. 4 is an enlarged fragmentary side view of one of the sub wheels and its engagement with the cam apparatus and drive apparatus for rotating the sub wheel and for camming and tilting the baskets of the sub wheel.

FIG. 5 is an enlarged front view of the cam mechanism and its engagement with the cam mounted to the pivotal baskets.

BRIEF DESCRIPTION OF PREFERRED

Briefly stated, the invention comprises a rotary oven having a housing with a main wheel rotatably mounted in the housing and heating means within the housing. A plurality of sub wheels are rotatably mounted at intervals about the circumference of the main wheel, and a plurality of baskets are pivotally mounted at intervals about the circumference of the sub wheels. The baskets are adapted to receive corn cobs therein for supporting the cobs inside the housing while the heating means cooks the corn cobs. A main wheel is mounted to the exterior of the housing communicating with the main wheel inside the housing for rotating the main wheel inside the housing. An engagable drive is engagable with the sub wheels, from the exterior of the housing, for engaging and drivings the sub wheels in rotation, and cam means are provided for engaging cams mounted on the baskets for pivoting the baskets to one side for emptying the baskets. Moisture distributing means are mounted within the housing for distributing moisture in the interior of the housing for providing moisture on the corn cobs while they are being cooked.

Figure 2:
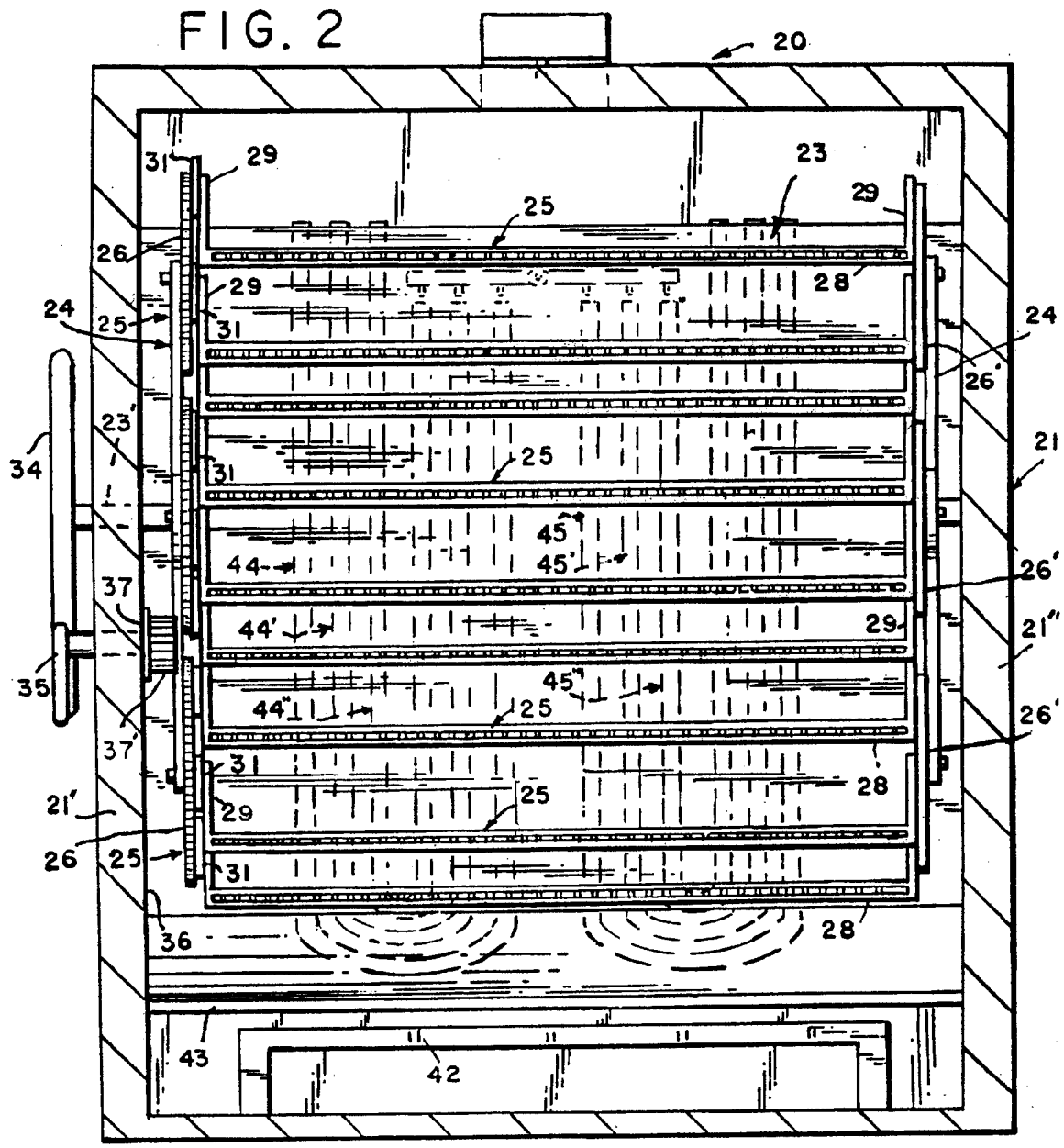
FIG. 2 is a side view of the rotary oven invention taken along line 2—2 of FIG. 1.
Figure 1:
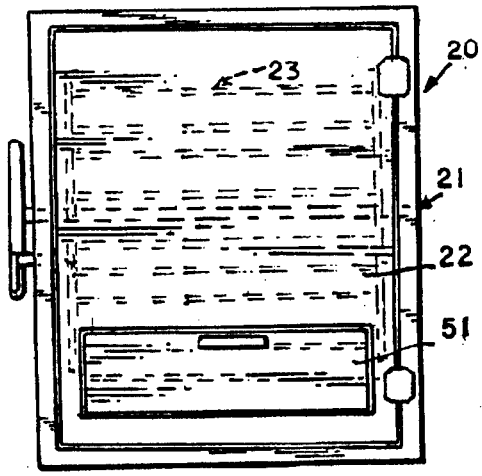
FIG. 1 is a front elevational view of the rotary oven invention.
Figure 3:
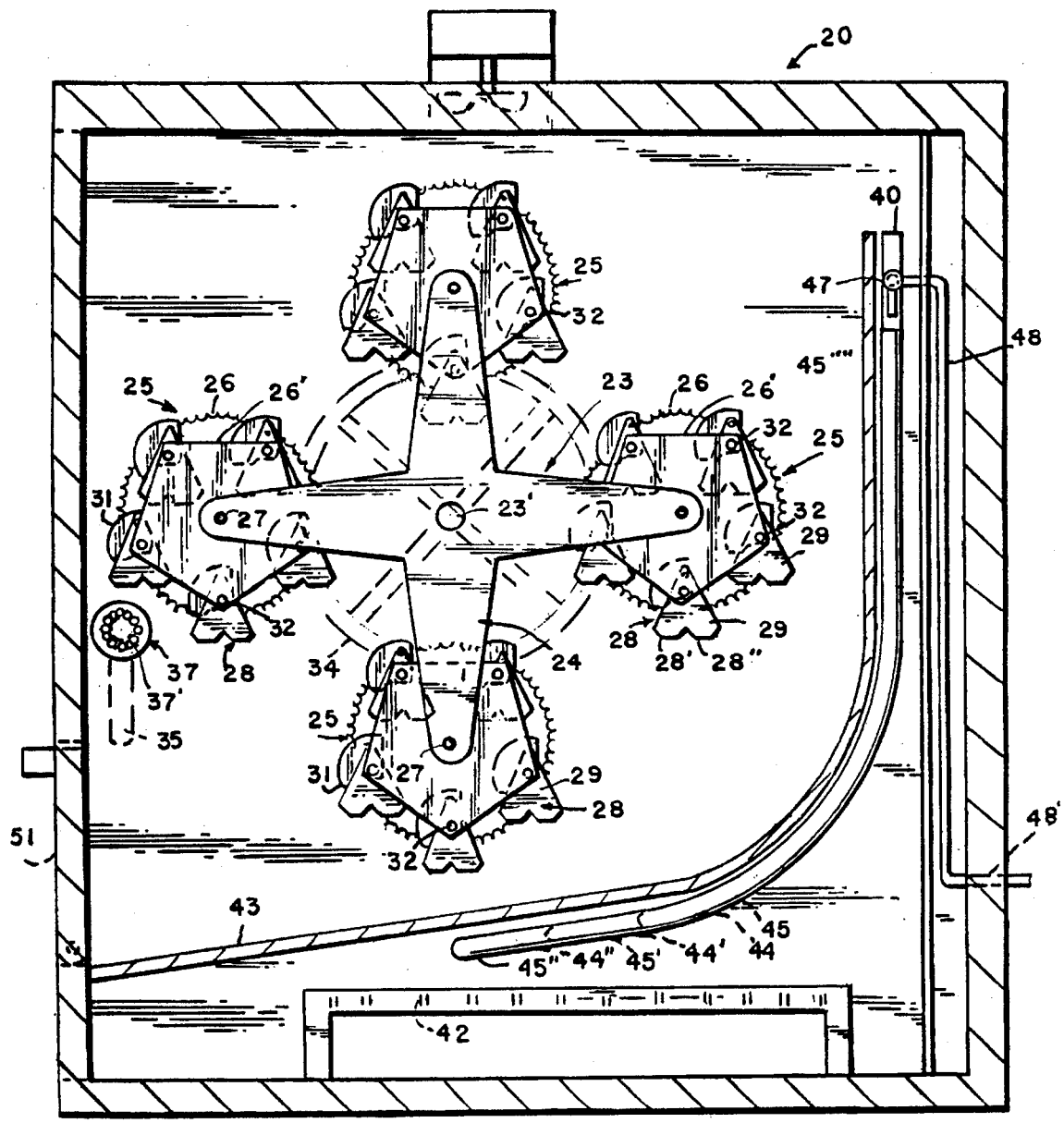
FIG. 3 is a front cutaway view of the rotary oven invention.

Referring more particularly to the drawings, in FIGS. 1, 2 and 3 the oven apparatus 20 is illustrated having a metal housing 21, with a door 22 pivotally mounted to the front of the housing. A main wheel 23 is pivotally mounted to the housing by a center shaft 23' which extends through the center of the main wheel and has its ends rotatably mounted in the side walls 21' and 21" of the housing. The main wheel 23 has a plurality of radial arms 24 extending outward from each end of the main wheel. The arms 24 have their inner ends fixed to a pair of center plates 25 and 25' at each end of the main wheel and extend radially outward therefrom.

A plurality of peripheral, circumferential, or sub wheels 25 are rotatably mounted to the outer ends of each of the radial arms 24. The peripheral, circumferential, or sub wheels 25 each have a pair of outer center plates 26 and 26' and a center pins 27 which extends from the outer end of each of the arms 24 through each of the center plates 26 and 26' to pivotally mount each of the center plates forming peripheral, circumferential, or sub wheels 25 to each of the arms 24 on each side of the main wheel. A plurality of wire mesh elongated baskets 28 each have a triangular plate 29 fixed to each end of the baskets and extend up ward on each side of the main wheel with their upper ends pivotally mounted to the outer circumferential edges of the plates 26 and 26' of each of the peripheral, circumferential, or sub wheels at pivot 32 at intervals about the circumference of the peripheral or sub wheels 25. The baskets 28 are elongated and each extends from their mounting to one of the center plates 26 on one side of the main wheel and to their pivotal mounting on one of the center plates 26' of the peripheral or sub wheel on the other side of the main wheel 23.

Each of the baskets 28 have a pair of channels 28' and 28" formed along the bottom of the baskets which extends along the length of baskets from their one ends to their other ends.

The triangular plates 29 of each of he baskets on the one side of the main wheel 23 28 have a cam plate 31 with a quarter circle conformation and are mounted in fixed relation to each of the baskets. The cam plates 31 of each basket are mounted to the baskets through the pivotal mounting of the triangular plate 29 to the center plate 26 at bolt pivot 32 and being mounted to the triangular plates at a second bolt connection 32' above the pivotal connection 32 of the triangular plates 29 to thereby fix the cam plates in relation to the baskets 28 and the triangular plates 29 of the basket on the one side of the main wheel 23.

The center plates 26 forming the peripheral, circumferential, or sub wheel 25 on the one side of each of the radial arms 24 of the main wheel 23, which form the center plates for the peripheral, circumferential, or sub wheels 25, each have a series of teeth 30 along the outer circumferential edge of the plates 26 forming the peripheral, circumferential, or sub wheels 25. The housing 21 has a drive wheel 34 outside the main housing fixed to the center of the main wheel 23 inside the housing 21 to rotate manually the main wheel in the housing from outside the housing. A rotary handle 35 for the peripheral, circumferential, or sub wheels drive 35" is rotatably mounted to the outer housing spaced from the drive wheel 34. The handle 35 has a center shaft 34 fixed thereto which is rotatably mounted in the side wall 36 of the housing and extends therethrough into the interior of the housing. A rotary gear 37 is fixed axially to the center shaft 35' of the handle 35 and has a series of teeth 37' about its outer circumference on a diameter substantially smaller than the diameter of the center plate 26. When the handle 35 is pushed axially inward into the housing the rotary gear slides inward within the housing to a position that its rotary gear 37 will engage the teeth 30 of the plates 26, when the plates 26 have been rotated by rotating the main wheel 23 to a position along the front of the main wheel 23 just below the horizontal center of the main wheel as illustrated in FIG. 5. When one of the peripheral, circumferential, or sub wheels 25 is in its position, as shown in FIG. 5; the teeth 30 along the outer circumferential edge of the circular plate 26 forming the peripheral, circumferential, or sub wheels 25 will engage the teeth 37' of the rotary gear 37. The gear 37 is fixed to handle 35 so that rotation of the handle 35 clockwise, when viewed from FIG. 5, rotates the peripheral, circumferential, or sub wheel 25, by the teeth of gear 37 engaging the teeth of plate 26 of peripheral or sub wheel 25 to rotate plate 26 of peripheral or sub wheel 25, thereby rotating the wheel 25, and rotating the baskets 28 of wheel 25.

When the gear 37 is slid axially inward as shown in solid lines in FIG. 5; the rotation of wheel 25 causes the cam plate 31, to each basket, to engage the circular outer gear portion or disc like portion 40 at the outer end of gear 37, by the bottom edge 31" engaging the outer edge 37' of the gear 37, which engagement pivotes the cam 31 of each basket clockwise when viewed from FIG. 5 about the pivotal mounting 32 of the basket and cam plate to the plate 26. This also thereby pivots the basket 28 clockwise about the axis of pivotal mounting 32 for tipping the basket to one side as shown in phantom lines and designated by numeral 50. This empties the baskets 28 of any corn therein in that sub wheel in a series, one basket after the other in that wheel, as the rotation of the handle 35 rotates that sub wheel and positions the cam plate 31 of each basket 28 so that the cam plate engages the disc portion 40 as the sub wheel continues to rotate.

Beneath the main wheel 23 are a plurality of pipes 43 connected together to form a conventional gas furnace with heating jets 42' along the top of the pipes acting to generate heating inide the oven housing for cooking corn cobs, when placed in the channels 28' and 28" of each basket of each of the sub wheels 25 of the main wheel 23. A bottom plate 43 forms a second bottom above the gas jets 42', which extends downward along the back of the housing in spaced relation to the back of the housing and extends along the bottom of the housing in spaced relation above the jets 42'. The plate 43 tapers downward along the front and bottom of the housing and terminates in front of and at the bottom of a small door 51 pivotally mounted in the main door 22.

Each of the cam plates 31 have a notched out area 31' to allow the cam plate 31 to travel past the disc 40, once the disc 40 has engaged the outer portion 31" of the cam plate and pivoted the cam plate 31 and its basket 28 to an angle to empty the basket.

Behind and below the bottom plate 43 and spaced above the furnace jets 42' are six water pipes 44, 44', and 44", and 45, 45', and 45" which have their one ends 46 aligned beneath a water distributing outlet 47. The pipes extend downward from the outlet over the top of the heat jets and then curve back and up along the back wall 21" of the housing 21. The pipes are open from one end to the outer end. The water outlet 47 is mounted to the back wall of the housing, and a pipe 48 connected at its one end 43' to a a source of water under pressure, and the outlet 47 extends forward from the back wall over the top of the one open ends 46 of the six water pipes 44–45" and have needle like nozzles which extend down into the open ends 46 of the pipe to deliver a small constant stream of water into the pipes. The water will travel down the pipes to the portion of the pipes over the heating jets 42' where the heat from the jets will turn the water into steam, and it will rise and travel out the other ends 49 of the pipes into the air inside the oven housing to provide moisture to any corn cobs being cooked in the baskets 28 of the main wheel also from the heating of the heat jets 42'.

Operation

The oven apparatus 20 will operate as follows:

The operator will initially load all the baskets 28 of the sub wheels 25 of the apparatus with corn on the cob. The dual channels 28' and 28" of the baskets are of a length to accomodate at least three or four cobs of corn in each channel for a total of at least 6–8 cobs of corn in each basket 28. This enables a relatively large amount of cobs of corn to be cooked simultaneously in the baskets of the sub wheels of the apparatus at one time.

To load the baskets with corn, the operator will normally open the front door 22 of the oven and then rotate the main wheel 34 to rotate the main wheel of the apparatus to bring each of the sub wheels to the front of the housing with their baskets to enable the operator to load the baskets. Once a sub wheel is brought to the front of the housing, the operator may manually turn the sub wheel to bring each of the baskets 28 in that sub wheel to the front of the apparatus to enable the operator to load that basket while in front.

Once all the baskets 28 have been loaded with cobs of corn to be cooked, the operator will close the door 22 and turn on the gas heating jets 32' beneath the bottom plate 43 of the housing. The heat from the gas jets will cook the corn in the baskets, and the operator will turn the main wheel 34 from time to time so that each cob of corn can receive substantially the same intensity of heat from the jets for cooking more evenly Once the corn cobs in the baskets have been cooked a sufficiently long period of time for proper cooking of the cobs, the operator may unload the baskets as desired by rotating the main wheel until a 23 until a peripheral or sub wheel 25, with its baskets loaded with cooked cobs of corn, is positioned in front of the housing in alignment with the rotary gear 37, so that when the handle 35 is pushed axially inward into the housing, it will slide the rotary gear 37 into engagement with the teeth 30 of the circular plate 26 of the peripheral, circumferential, or sub wheel. The gear 37 is shown axially inward in solid lines in FIG. 5, as previously indicated. Whereupon the operator may rotate the handle 35 which through the engagement of its gear 37 with the teeth 30 of the plate 26 of the aligned peripheral or sub wheel 25 will rotate the plate 26 of the aligned, peripheral, circumferential, or sub wheel 25 and thereby rotate all the baskets 28 about the center pivot 32 of the plate 26 of the peripheral or sub wheel 25. The main wheel 23 will be rotated counter clockwise when viewed from FIG. 3 and the peripheral sub wheel 25 will be rotated counterclockwise when viewed from FIG. 3, so that as the cam plates 31 of each of the baskets as they engage downwardly upon the disc 40 of gear 37, the outer edge 31" of the cam plates will engage the disc 40 at its upper edge and the engagement while the sub wheel continues to rotate counter clockwise, will pivot the baskets 28 clockwise to an angle as shown in phantom lines 50, with this angle being sufficient to tip the cobs out of the basket onto the bottom plate 43 in the housing. The cobs, once emptied, will gravitate down the bottom plate and come to rest against the small door 51 pivotally mounted in the large door 22. The small door 51 has a handle fixed to its upper outer surface and is pivotally mounted to the large door. The small door may be opened from time to time by the operator to remove cobs emptied from the baskets without having to open the large door 22.

It will be obvious that various changes and departures may be made to the invention without departing from the spirit and scope thereof, and accordingly, it is not intended that the invention be limited to that specifically described in the specification, or as illustrated in the drawings, but only as set forth in the appended claims wherein:

What is claimed is:

1. A corn cob apparatus comprising a housing, a main wheel rotatably mounted to said housing to rotate about a horizontal axis, said main wheel having a center rotational support with a plurality of radial arms extending radially outward from the center rotational support, said main wheel having a center shaft rotationally mounted to said housing to provide said rotational mounting for said main wheel; a plurality of peripheral wheels, said main wheel radial arms having outer ends with the radius of the radial arms at their outer ends substantially larger than the radius of each peripheral wheel, each peripheral wheel being rotatably mounted to the outer ends of each radial arm, each peripheral wheel having toothed outer circumferential edges, a plurality of baskets each having an upward extending support plate with the support plates pivotally mounted to the peripheral wheels at intervals about the periphery of each peripheral wheel with the baskets depending on the support plates below their pivotal mounting to the peripheral wheel, means to rotate the main wheel to rotate its radial arms about the axis of the center shaft, gear drive means and trip means mounted to said housing, means to stop the main wheel with a selected peripheral wheel aligned with the drive means and trip means; each of said baskets having cam means, said gear means acting to rotate said selected aligned peripheral wheel with said trip means acting to engage the cam means of the baskets of the selected aligned peripheral wheel to pivot said baskets to one side for emptying the baskets after cooking corn corns placed in the baskets; floor means in said housing extending along the back of and bottom of the main wheel and the peripheral wheels thereon to receive corn cobs emptied from the baskets by tripping and allowing them to travel by gravity from the back and bottom of the floor means to the front of the housing; means to heat the housing.

2. A oven apparatus for cooking corn cobs comprising a housing, a main wheel rotatably mounted in said housing at its center axis, said main wheel having radial support means extending radially outward from its center axis, a plurality of peripheral wheels each rotatably mounted to the radial support means of the main wheel at intervals about the outer circumference of the radial support means, said peripheral wheels each having a plurality of baskets mounted to the peripheral wheels about the outer periphery of each of the peripheral wheels and being supported on the peripheral wheels at intervals about the outer periphery of the peripheral wheels, said main wheel support means having an outer radius greater than the radius of the peripheral wheels, each of the baskets having emptying means for emptying the baskets of their contents, said apparatus having trip means for activating the emptying means of the baskets, means to rotatably drive the peripheral wheels, whereby the main wheel may be rotated relative to the trip means to align a selected peripheral wheel with trip means and whereby the means to rotatably drive the peripheral wheel may rotate the selected aligned peripheral wheel and the trip means may engage and activate the emptying means of the baskets on the aligned peripheral for emptying the baskets of corn cobs therein after cooking the corn cobs in the housing, means in the housing to heat and cook the corn cobs in the baskets in the housing.

3. A corn cob oven apparatus according to claim 2 wherein said baskets each have a plurality of parallel channels whereby a plurality of corn cobs may be mounted in each basket in parallel relation to one another in each of the parallel channels of the baskets.

4. A corn cob cooking oven apparatus for cooking corn cobs comprising a housing, heating means in said housing for cooking corn cobs, a main wheel having a center rotational support with a plurality of radial arms having outer ends and extending radially outward from the center support, said main wheel having a center shaft in said center rotational support with said shaft rotatably mounted to said housing to provide rotational support for said main wheel, a plurality of peripheral wheels, said main wheel having a radius for its arms significantly larger than the radius of said peripheral wheels, said peripheral wheels being rotatably mounted to the outer ends of the arms of the main wheel, peripheral drive and trip means mounted to said housing, a plurality of baskets for carrying corn cob for cooking in said housing, said plurality of baskets each having upward extending support plates with the upper ends of the support plates pivotally mounted to the peripheral wheels at intervals about the periphery of the peripheral wheels, with the said baskets depending on said support plates below the pivotal mountings of the support plates to the peripheral wheels, means to rotate the main wheel about its center shaft to position a selected peripheral wheel in alignment with said peripheral drive and trip means, means to engage said peripheral drive and trip means to said selected peripheral wheel when aligned to rotate said peripheral wheel and trip said baskets of said selected peripheral wheel by pivoting said baskets to one side for emptying the baskets of said selected peripheral wheel of the corn cobs after cooking the corn cobs in the housing by the heating means.

5. A corn cob cooking oven apparatus for cooking corn cobs comprising a housing, heating means in said housing for cooking corn cobs, a wheel rotatably mounted in said housing, a plurality of baskets for carrying corn for cooking in said housing, said baskets being mounted to said wheel at intervals about the circumference of said wheel, each of said baskets having emptying means, trip means in said housing to activate said emptying means of said baskets for emptying said baskets of corn, means to engage and disengage said trip means to activate said basket emptying means, means to rotate said wheel to rotate said baskets into alignment with said trip means, said trip means upon engagement acting to activate the emptying means on said baskets as said baskets are rotated into alignment with said emptying means upon rotation of said wheel.

\* \* \* \* \*